United States Patent [19]

Mutti et al.

[11] Patent Number: 4,765,368

[45] Date of Patent: Aug. 23, 1988

[54] VALVE ASSEMBLY FOR SINGLE-CONTROL MIXING VALVE

[75] Inventors: Fabio Mutti, Lonato; Luigi Gatti, Castiglione delle Stiviere, both of Italy

[73] Assignee: Rubinetterie Rapetti S.P.A., Castiglione delle Stiviere, Italy

[21] Appl. No.: 922,382

[22] Filed: Oct. 23, 1986

[30] Foreign Application Priority Data

Oct. 23, 1985 [DE] Fed. Rep. of Germany ....... 3537634

[51] Int. Cl.$^4$ ............................................. F16K 11/06
[52] U.S. Cl. .................. 137/625.4; 137/550; 137/625.17
[58] Field of Search .............. 137/625.4, 625.17; 251/356, 357, 118, 127

[56] References Cited

U.S. PATENT DOCUMENTS 3,893,482  7/1975  Loose ............................ 137/625.17
4,327,771  5/1982  Nikolayezik .................... 137/625.4

Primary Examiner—Martin P. Schwadron
Attorney, Agent, or Firm—Herbert Dubno; Andrew Wilford

[57] ABSTRACT

A valve assembly for a plate-type flow-control valve has a stationary plate having a planar upper face and formed with at least one inlet port and with an outlet port opening offset therefrom on the upper face and a movable plate having a planar lower face slidable on the upper face of the stationary plate and formed with a pocket open at the face and defined by a generally flat floor having an outer periphery and an annular side wall extending from the periphery to the faces. An annular screen in the pocket has an inner wall inward of the side wall and itself having a lower edge spaced slightly above the faces and an end wall extending outward from the lower edge to the side wall generally at the faces. This screen defines with the side wall and outer periphery of the floor an annular chamber extending in the pocket around the outer floor periphery.

9 Claims, 2 Drawing Sheets

VALVE ASSEMBLY FOR SINGLE-CONTROL MIXING VALVE

FIELD OF THE INVENTION

The present invention relates to a valve assembly for a single-control mixing valve. More particularly this invention concerns a hot/cold mixing valve of the type used in a faucet.

BACKGROUND OF THE INVENTION

A standard such valve assembly has a normally stationary plate formed with a single output port and at least one inlet port opening adjacent each other on the planar upper face of this stationary plate. A movable plate has a planar lower face pressed against the plate and formed with a recess that forms a downwardly open pocket opening at this lower face. An actuating element, normally a lever, can slide the movable plate on the fixed plate to a flow position in which the pocket is aligned with one or both of the inlet ports and with the outlet port for flow therebetween and a blocking position not covering the outlet port at all so that there is no flow between the ports. In the flow position the extent of overlap of the pocket with the various ports can control the amount of flow and the ratio of any mix obtained. Such valves are extremely popular, but have the considerable disadvantage that the reversal of direction effected in the pocket of the movable plate causes turbulence that generates noise.

Hence German patent No. 2,356,326 of A. Fowell et al proposes fitting a screen inside the pocket. This screen extends parallel to the interface plane between the plates, spaced down from the floor of the pocket. Thus the water entering from the inlet port or ports flows up through this screen which has the standard noise damping effect. At the same time the screen does interfere with flow so that it creates noise, albeit of a different type, itself, and acts as a restriction. Furthermore the considerable flow through it can quickly clog it with particles, thereby requiring dissassembly of the valve to restore full and quiet flow.

Another system is suggested in German patent document No. 2,819,065 of H. Zwink. It has a screen on one of the side walls of the pocket. Such a system has only a modest sound-damping effect and also clogs with particles over time.

OBJECTS OF THE INVENTION

It is therefore an object of the present invention to provide an improved valve assembly for a plate-type flow-control valve.

Another object is the provision of such a valve assembly for a plate-type flow-control valve which overcomes the above-given disadvantages, that is which has substantial noise-damping effect and that also does not tend to clog with use.

SUMMARY OF THE INVENTION

A valve assembly for a plate-type flow-control valve according to the invention has a stationary plate having a planar upper face and formed with at least one inlet port and with an outlet port opening offset therefrom on the upper face and a movable plate having a planar lower face slidable on the upper face of the stationary plate and formed with a pocket open at the face and defined by a generally flat floor having an outer periphery and an annular side wall extending from the periphery to the faces. An annular screen in the pocket has an inner wall inward of the side wall and itself having a lower edge spaced slightly above the faces and an end wall extending outward from the lower edge to the side wall generally at the faces. This screen defines with the side wall and outer periphery of the floor an annular chamber extending in the pocket around the outer floor periphery.

The valve assembly has excellent sound-damping abilities, yet offers only inconsequential resistance to flow. In addition the chamber, which is wholly closed, cannot fill with particles. Instead any particles in the flow will at worst lodge on the outside of the screen so that normal use of the valve will dislodge them.

According to another feature of this invention the chamber is generally circular. In addition the end wall of the screen extends at an angle to the faces and has an inner periphery and an outer periphery, the latter being closer to the face than the former. The end wall forms with the faces an angle of between 5° and 20°. This minimizes blockage of flow while giving very good sound-deadening properties to the valve. For most effective sound damping the area of the end wall is generally equal to half of the area of the floor of pocket.

The inner wall in accordance with the invention extends generally parallel to the side wall and may also extend generally perpendicular to the floor of the pocket. This inner wall has an upper edge engaging the floor and the screen also has an outer wall extending generally parallel to the inner wall and lying against the side wall in the chamber so the screen is of U-section.

For finest possible mesh size at minimum cost the screen is formed of a pair of layers of mesh. The meshes have wires or oriented rows of perforations that extend at an angle not equal to 90° or 180° to those of the other meshes. Typically the wires of each mesh are perpendicular and the angular offset between adjacent meshes is 45°.

DESCRIPTION OF THE DRAWING

The above and other features and advantages will become more readily apparent from the following, reference being made to the accompanying drawing in which.

SPECIFIC DESCRIPTION

Figure 3:
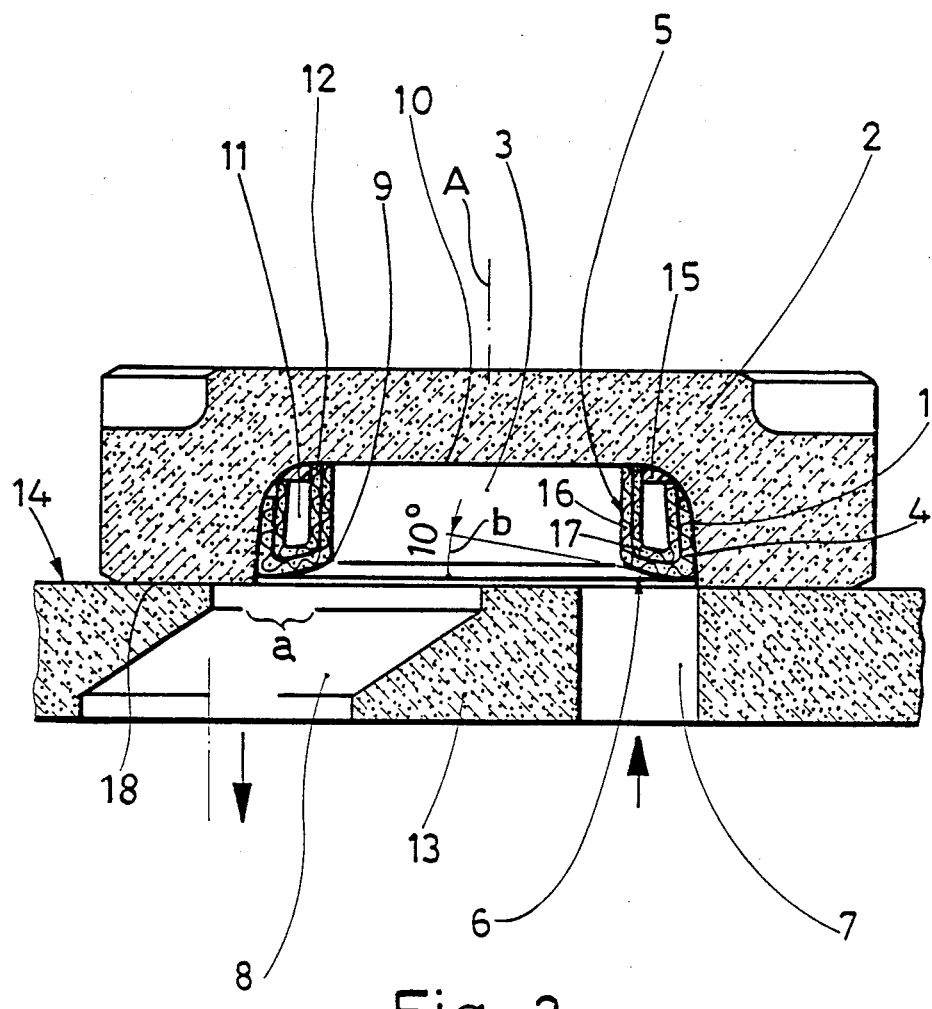
FIG. 3 is a view like FIG. 2 but showing the fixed plate also.

As seen in the drawing, in particular FIG. 3, a stationary plate 13 has a pair of inlet ports 7 (only one visible) respectively receiving hot and cold water and an outlet port 8 that normally opens into a faucet. The ports 7 and 8 open at a planar upper face of the plate 13, the vertical position shown of course being optional and such references to the vertical merely being made for convenience.

Figure 1:
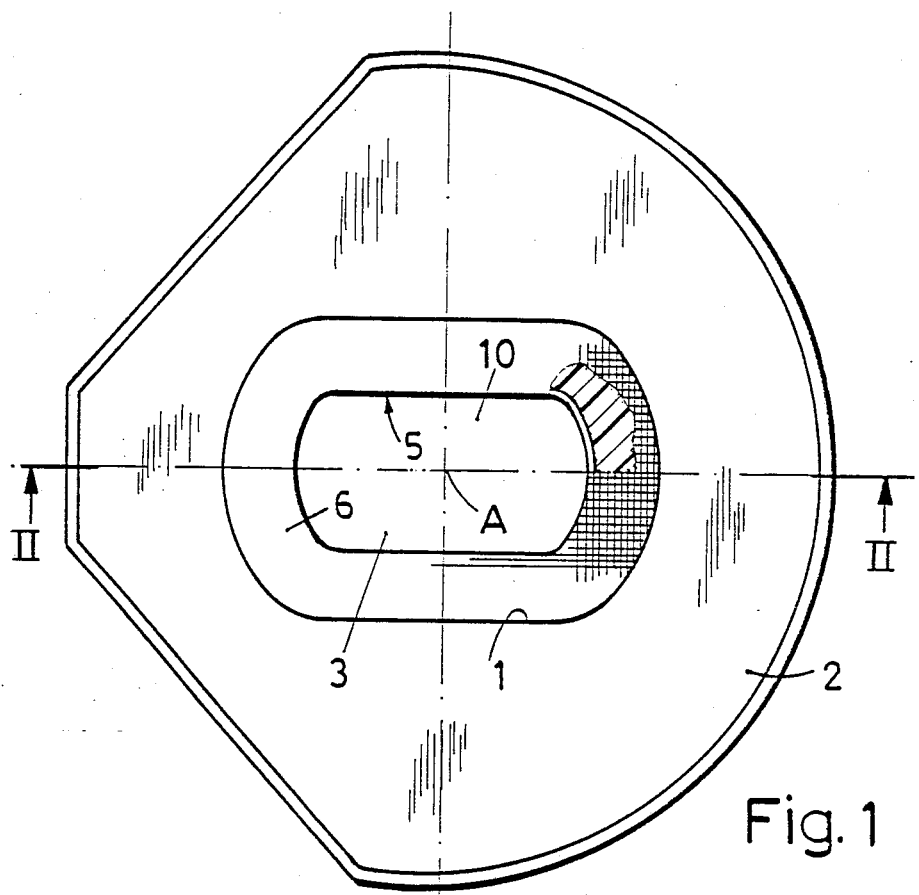
FIG. 1 is a bottom view of the movable plate of the valve assembly according to this invention.
Figure 2:
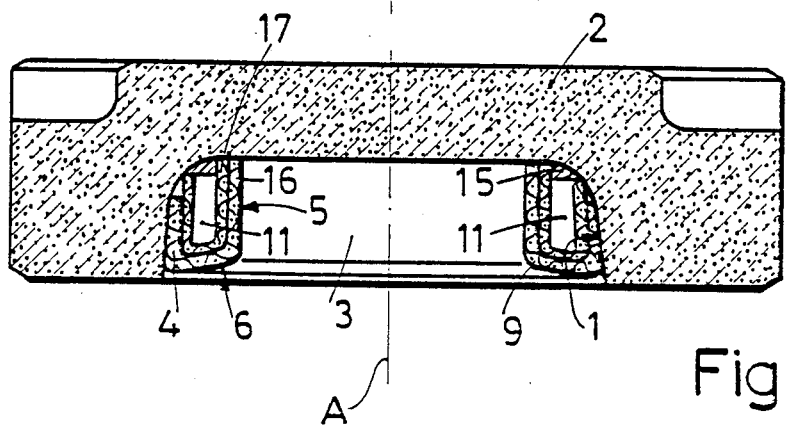
FIG. 2 is a section taken along line II—II of FIG. 1.

An upper plate 2 formed of ceramic like the lower plate 13 has a planar lower face 18 sitting flatly atop the face 14 and is formed with a pocket 3 opening at this face and defined by a generally planar floor 10 extending parallel to the faces 14 and 18 and an annular side wall 1 extending from the outer periphery of the floor down to the face 13. The side wall 1 is somewhat downwardly flared and is vaguely circular or oval as seen in FIG. 1 and generally centered on a normally vertical axis A perpendicular to the faces 14 and 18. It would of course be possible to make the plate 2 stationary and the plate 13 movable, the relative terminology being used here merely for convenience.

As is standard, a lever system can slide the movable plate 2 on the fixed plate 13 to vary the overlap of the pocket 3 with the ports 7 and 8. When the pocket 3 overlaps all the ports 7 and 8, a mixture of the hot and cold water from the ports 7 exits the valve from the port 8. When only one of the ports 7 and the port 8 are thus connected, only hot or cold water flows from the port 8. Similarly when the port 8 is not aligned under the pocket 3 there is no flow from this port 8.

According to the invention a U-section screen 4, 5, 6 fits within the pocket 3. It is upwardly open with an outer wall 4 lying flatly against the side wall 1, an inner wall 5 that extends perpendicular to the floor 10, and an end wall 6 interconnecting the lower edges of the walls 4 and 5. This lower edge of the inner wall 5 is above the faces 14 and 18 and also above the lower edge of the outer wall 4 which is close above these faces 14 and 18 so that the end wall 6 forms an angle b of between 5° and 20°, here 10° to the faces 14 and 18. In addition the radial dimension a of the screen 4, 5, 6 is such that it takes up about half of the area of the pocket 3.

The screen 4, 5, 6 is held in place by a bead 15 of adhesive at the outer periphery of the floor 10, the upper edges of the inner and outer legs 4 and 5 being imbedded in it. The screen 4, 5, 6 therefore defines an annular chamber 11 that is closed either by the walls of the screen or by the outer corner of the pocket 3. As a result no particles carried in the water flowing through the valve of this invention will be able to enter this chamber 11. Instead they will at worst lodge on the outside of the screen 4, 5, 6 so that normal operation of the valve will dislodge them.

Further according to this invention the screen 4, 5, 6 is actually formed by two U-section meshes 16 and 17 each formed of wires. The wires on the one mesh 16 are set to extend at 45° to those of the other mesh 17 so that an extremely fine effective mesh size is obtained, one that is a great deal less than that of either of the meshes 16 and 17.

We claim:

1. A valve assembly for a plate-type flow-control valve, the assembly comprising:

a stationary plate having a planar upper face and formed with a pair of inlet ports and with an outlet port opening offset therefrom on the upper face;

a movable plate having a planar lower face slidable on the upper face of the stationary plate and formed with a pocket open at the face and defined by a generally flat floor having an outer periphery and an annular side wall extending from the periphery to the faces;

an annular and U-section screen in the pocket having
 an outer wall lying on the side wall and having a lower edge generally at the faces and an upper edge engaging the floor at its outer periphery,
 an inner wall inward of the side wall, generally perpendicular to the lower face, and also having a lower edge spaced slightly above the faces and an upper edge engaging the floor inward of the outer periphery, and
 an end wall extending between the lower edges, the screen defining with the side wall and outer periphery of the floor an annular chamber extending in the pocket around the outer floor periphery; and means for sealing both of the upper edges to the floor for flow into and out of the chamber only through the screen.

2. The valve assembly defined in claim 1 wherein the chamber is generally circular.

3. The valve assembly defined in claim 1 wherein the end wall of the screen extends at an angle to the faces and has an inner periphery and an outer periphery, the latter being closer to the face than the former.

4. The valve assembly defined in claim 3 wherein the end wall forms with the faces an angle of between 5° and 20°.

5. The valve assembly defined in claim 1 wherein the area of the end wall is generally equal to half of the area of the floor of pocket.

6. The valve assembly defined in claim 1 wherein the inner wall extends generally parallel to the side wall.

7. The valve assembly defined in claim 1 wherein the screen is formed of a pair of layers of mesh.

8. The valve assembly defined in claim 7 wherein the meshes have oriented rows of perforations and the perforations of one of the meshes extend at an angle not equal to 90° or 180° to those of the other meshes.

9. The valve assembly defined in claim 8 wherein the rows extend generally at 45° to each other in the adjacent meshes.

* * * * *